United States Patent [19]

Szanto

[11] Patent Number: 4,844,801
[45] Date of Patent: Jul. 4, 1989

[54] MIXER-SETTLER APPARATUS HAVING A SUBMERGED CHUTE

[75] Inventor: Istvan Szanto, Sevres, France

[73] Assignee: Krebs & Cie, France

[21] Appl. No.: 61,170

[22] Filed: Jun. 11, 1987

[30] Foreign Application Priority Data

Jun. 13, 1986 [FR] France ................. 86 08594

[51] Int. Cl.⁴ ............ B01D 11/04; B01D 17/025
[52] U.S. Cl. ............... 210/205; 210/221.1; 210/258; 210/519; 210/511; 422/256
[58] Field of Search ........ 210/205, 206, 219, 220, 210/221.1, 252, 258, 511, 513, 519, DIG. 5; 422/256, 257

[56] References Cited

U.S. PATENT DOCUMENTS

| | | | |
|---|---|---|---|
| 2,697,384 | 12/1954 | Craig et al. | 210/221.2 |
| 2,728,457 | 12/1955 | Clarke et al. | 210/801 |
| 2,729,549 | 1/1956 | Reman et al. | 422/256 |
| 3,804,594 | 4/1974 | Orjans et al. | |

FOREIGN PATENT DOCUMENTS

| | | |
|---|---|---|
| 347362 | 1/1922 | Fed. Rep. of Germany . |
| 680747 | 10/1936 | Fed. Rep. of Germany . |
| 2710241 | 9/1977 | Fed. Rep. of Germany . |
| 1091624 | 4/1955 | France . |
| 2107461 | 5/1972 | France . |

Primary Examiner—Richard V. Fisher
Assistant Examiner—Linda S. Evans
Attorney, Agent, or Firm—Schoeder & Siegfried

[57] ABSTRACT

Mixer-settler apparatus of the reverse liquid flow type having at least one assembly which includes one or more mixers in series, each being fitted with stirrers and pumps, at least one settling tank in which liquids separate, and at least one submerged chute extending into the settling tank from a pump to convey the mixture of liquids from the pumps to the settling tank. The chute is constructed of enlarged dimensions which extend over a major portion of the width of the tank to facilitate a pre-settling action within the chute, and the chute extends a substantial distance into the settling tank to allow extended pre-settling time.

6 Claims, 2 Drawing Sheets

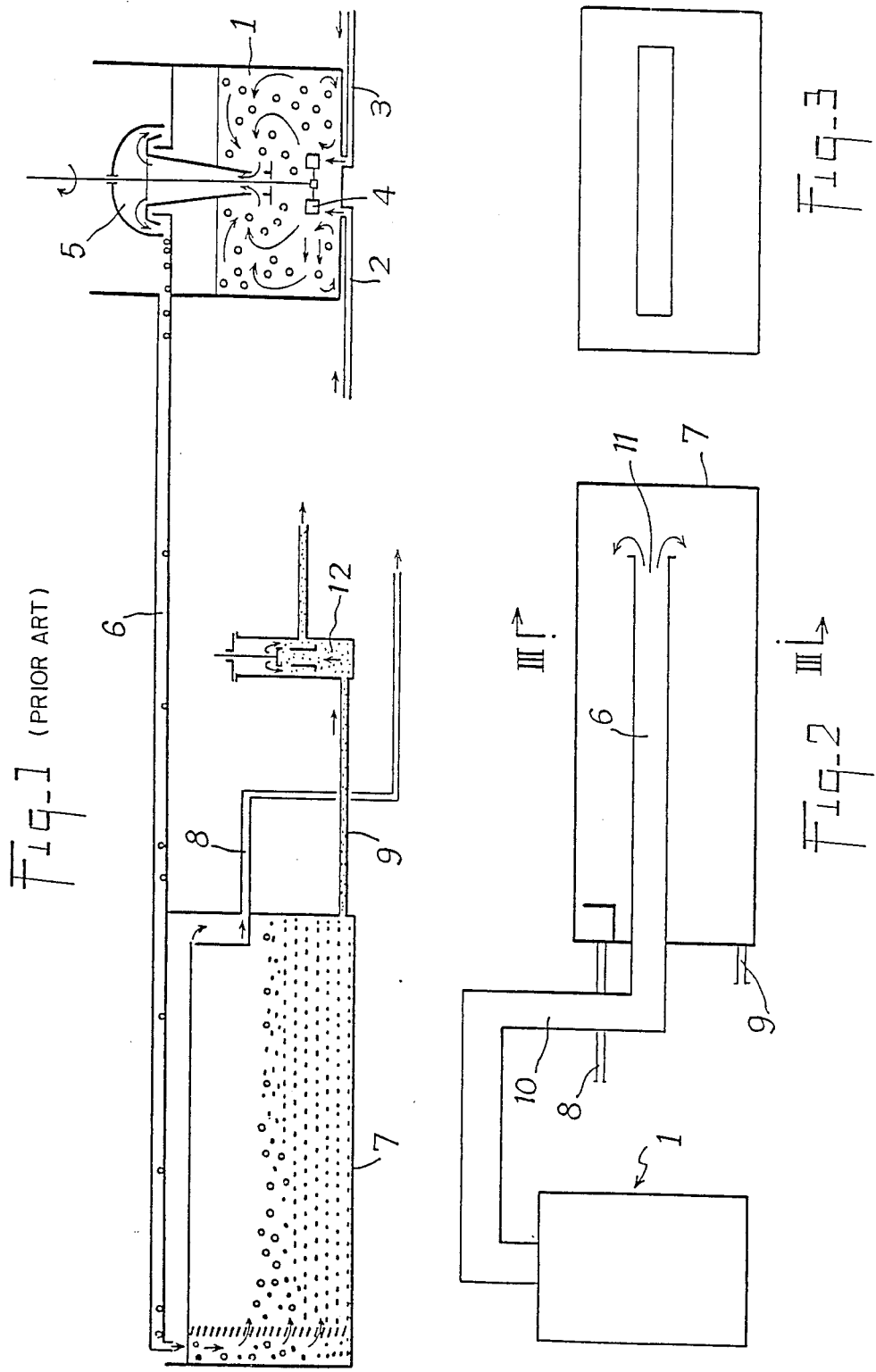

MIXER-SETTLER APPARATUS HAVING A SUBMERGED CHUTE

The present invention relates to a mixer-settler apparatus having a submerged chute.

BACKGROUND OF THE INVENTION

The mixer-settler process consists in producing a suitably fine dispersion of two immiscible liquids in one another for facilitating exchanges therebetween, and then in re-separating the two immiscible liquids by settling. In general, one of the liquids is constituted by an impure solution of a given substance, while the other liquid is an organic solvent serving either as a solvent which is specific to the substance in question, or else as a dilution medium for an ion exchanger specific to the substance in question. The complete installation generally comprises an extraction battery constituted by juxtaposing a plurality of mixer-settlers in which the impure solution of the substance under consideration flows as a counter-current to the organic liquid, followed by an identical type of re-extraction battery in which the organic liquid flows as a countercurrent to a pure solution which picks up the substance, thereby enabling the organic liquid to be used in a closed circuit.

Each mixer-settler in the battery is essentially constituted by a mixer which receives the two basic liquid substances and which stirs them together in order to obtain the required dispersion, followed by a settling tank through which the mixture flows slowly while progressively separating out by virtue of the liquids being immiscible and the dispersion being unstable. Clearly, for a given throughput, the bulk of each mixer depends on the length of time the dispersion remains therein before moving on to the settler, and this length of time depends on the efficiency of the exchanges, which efficiency increases with increasing fineness of the dispersion. Similarly, the bulk of each settler depends on the length of time it is occupied by the dispersion passing therethrough, and this length of time is a function of the speed at which the dispersion coalesces, and the finer the dispersion, the slower the speed at which it coalesces. Consequently, there is always an overall optimum size for the droplets in the dispersion which provides minimum bulk and thus minimum cost for any given installation.

In addition to the mixer and the settling tank, the liquids and the mixtures of liquids are moved through the installation by means of pumps or by means of stirring pumps.

Accompanying FIG. 1 is a diagram of a mixer-settler of the type to which the present invention is applicable. In this figure:

a mixer 1 has liquid inlets 2 and 3 and a stirrer 4;

a pump 5 raises the mixture made in the mixer to a suitable level;

a chute 6 conveys the liquid mixture leaving the pump 5 to the inlet to the settling tank 7 in which the two liquids flow at slow speed and separate progressively in order to give rise firstly to a light phase (generally organic) which is removed at 8, and secondly to a heavy phase (generally aqueous) which is removed at 9; and a regulator 12 sets the level of the interface between the two phases.

It may be observed, and this is one of the essential characteristics of installations of the type described above and consequently of installations to which the present invention is applicable, that the settling tank 7 is fed from the end thereof (called the feed end) which is furthest from the mixer, and as a result:

firstly a chute 6, which may be very long, must be provided in order to convey the mixture of liquids to the feed end of said tank; and secondly the liquid flow direction through the settling tank 7 takes place towards the pump 5 which feeds the chute 6; the liquid separated in the settling tank thus leaves said tank from the face thereof which is closest to said pump 5 (or from the immediate vicinity of said face).

Such installations may be referred to as "reverse liquid flow" installations (since the liquid flow direction in the settling tank takes place towards the pump which feeds said settling tank), and they constitute the type of installation to which the present invention is applicable. In such installations, the settling tank thus has a liquid "inlet face" which, in conventional installations, is the face furthest from the feed pump, and a liquid "outlet face" for liquids that have settled, which face is closest to said pump.

Designing and using installations of this type shows:

firstly, given the flow of the liquids along the chute and the length of said chute, that a degree of liquid separation generally takes place in said chute, and if said liquids are not to be re-mixed on insertion into the settling tank, special precautions must be taken at the end of the chute; and secondly, in large installations, that the construction and support of the chute give rise to certain difficulties.

SUMMARY OF THE INVENTION

It has been discovered, and this constitutes the idea on which the invention is based, that a mixer-settler apparatus of the above-described type can be considerably improved in several respects by using a chute which is submerged inside the settling tank.

Such use of a submerged chute in accordance with the invention implies that said chute enters the settling tank via the face thereof which is defined above as being the "outlet face" and that the separated liquids leave said settling tank likewise from said "outlet face" (as before) or from the vicinity of said face. the term "vicinity of" is used since installations may be designed from which the separated liquids are removed respectively from the top face and from the bottom face of said tank, but even then, said outlets are always provided in the immediate vicinity of said "outlet face".

The present invention thus provides a mixer-settler apparatus comprising at least one assembly constituted by one or more mixers in series equipped with stirring and pumping means, at least one chute, and a settling tank fed by a flow of liquid from said chute(s), said apparatus being of the "reverse liquid flow" type and said chute being submerged inside said settling tank.

BRIEF DESCRIPTION OF THE DRAWING

An embodiment of the invention is described by way of example with reference to the accompanying drawing in which:

FIG. 1 is a diagrammatic vertical section of a prior art apparatus, as already described above; and FIG. 2 is a diagram of apparatus in accordance with the invention.

FIG. 3 is a diagrammatic sectional and view of the settling tank having an enlarged immersed chute disposed therein, taken along lines III—III of FIG. 2.

MORE DETAILED DESCRIPTION

Figure 4:
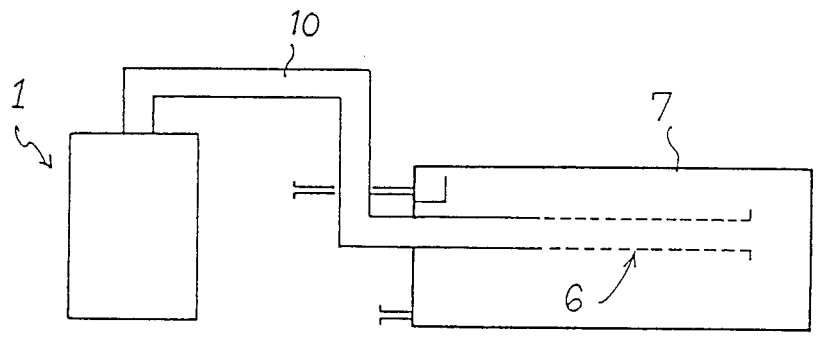
FIG. 4 is a diagram of an apparatus in accordance with my invention, wherein a diagrammatic sectional view of the settling tank shows openings in the upper and lower surfaces of the submerged chute.
Figure 5:
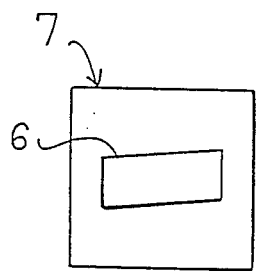
FIG. 5 is a diagrammatic sectional end view of a settling tank and submerged chute in accordance with my invention, showing an alternative embodiment wherein the submerged chute has sloping top and bottom faces.

Reference is made to FIG. 2 which is a longitudinal vertical section through apparatus in accordance with the invention. In this figure:

reference 1 designates a "mixer-pump" system of the type referenced 1, 2, 3, 4, and 5 in FIG. 1;

reference 7 designates a settling tank of generally rectangular shape;

reference 6 designates the chute which is in the form of a duct and which comprises an inlet 10 for liquids coming from the mixer-pump system assembly 1 and an outlet 11 situated inside said settling tank; and references 8 and 9 designate respective outlets for the light and heavy liquid phases; these phases separating out from the mixture as it moves through the settling tank.

The term "immersed chute" as used in the present invention designates a feed chute which enters the settling tank via one vertical face thereof (the "outlet face"), runs along substantially the entire length of said tank, and opens out inside said tank in the immediate vicinity of the inside face of the vertical wall opposite to the inlet face of said tank.

The immersed chute should thus be considered as extending inside the tank over about 80% to 95% of the length of the tank.

Further, in order to facilitate early separation of the mixture of liquids in the submerged chute, the submerged chute extends, in accordance with the invention, over an appreciable fraction of the total width of the tank.

It may be feared that having a submerged chute occupying a major portion of the length and a major portion of the width of the tank in which two liquids separate or "settle", thereby exchanging substance between the bottom portion and the top portion of said tank, would considerably hinder or slow down such exchanges. However, as shown in FIG. 3, it has been observed that providing the free space on either side of the chute (i.e. the space between the side walls of the chute and the facing side walls of the tank) occupies between about 10% and about 25% of the total width of the tank, such exchanges of substance are not reduced by the presence of the chute. In other words, provided the above-mentioned limits are complied with, the dimensions of the settling tank do not need changing when a submerged chute, in accordance with the invention, is fitted in such a settling tank. Thus, from the above discussion, it is readily apparent that the width of the chute occupies between about 75 and 90% of the width of the settling tank throughout a substantial portion of the length of the settling tank.

The vertical extent or height of the "submerged chute" in accordance with the invention does not appear to play a significant role in the context of the present invention. In general, the "submerged chute" will occupy between about 10% and about 30% of the total height of the settling tank.

Figure 6:
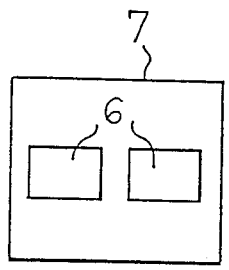
FIG. 6 is a diagrammatic sectional end view of a settling tank and a plurality of submerged chutes in accordance with an alternative embodiment of my invention.

As shown in FIG. 6, it is quite possible within the present invention, in particular in large installations, to feed the mixture of liquids to the tank via a plurality of parallel submerged chutes, rather than via a single submerged chute. In this case, the free space available for exchanges of substance should represent between about 10% and about 25% of the total width of the tank.

The vertical position of the chute(s) in the tank is not critical, however it is clearly preferable for the level of said chute to be substantially the same as the intended level within said tank for the boundary between said two liquid phases.

The chute(s) is/(are) generally rectangular in cross-section, thereby providing top and bottom faces which are generally horizontal. As shown in FIG. 6 it has been found that it may be desirable for the purposes of facilitating circulation in a downwards and/or an upwards direction of the heavy and/or light phases of the liquid mixture, that the top and/or bottom faces should be completely or partially inclined relative to the horizontal plane. In particular, if the chute is constituted by vertical faces which are interconnected by two (top and bottom) faces which are parallel and which slope towards one side of the tank, then any heavy substances will flow along the bottom face towards the bottom of the tank and any light substances will flow, on the other side of the chute, along the top face towards the top of the tank.

It has previously been mentioned that in prior installations separation tends to occur between the light and the heavy phases of said liquids as said liquids pass along the chute. This is also true when using a submerged chute in accordance with the present invention, and it is desirable for the dimensions of said "submerged chute" to be chosen in conjunction with the liquid flow rates in such a manner as to encourage a degree of settling within the chute. As shown in FIG. 4, by using a "submerged chute", it is possible to take advantage of this phenomenon by providing communication (holes, slots) through the bottom and top faces of the chute in those zones where one or other of the heavy and the light phases separate out inside said chute. Such communication serves to allow the phases under consideration to pass directly into the corresponding phases which are already to be found in the bottom portion (i.e. the heavy phase) or else in the top portion (i.e. the light phase) of the tank. This constitutes an advantage since the mixture which remains within the chute has additional transit time available for settling.

Such initial settling within the chute, preferably associated with the settled liquids being removed from the chute by using openings provided in the bottom and top faces thereof, suggests that in accordance with the invention it is possible to use a chute whose cross-sectional area varies along the tank. Thus, for example, if an average constant flow speed is to be maintained for the liquid flowing from one end of the submerged chute to the other, it is necessary in order to take account of the progressive removal of the liquids which settle therein, to have a chute whose cross-section tapers as the submerged chute extends further into the settling tank.

It may be observed, in practice, that it is quite possible and sometimes desirable when implementing the invention to constitute a submerged chute by using one or more rows of submerged ducts.

Finally, mention should be made of one of the major advantages of using a submerged chute: it is much easier to support. The "weight" of the chute is naturally much less if the chute is submerged in a liquid medium rather than extending through a gaseous medium.

The following non-limiting numerical example illustrates the invention:

a mixer-settler as been built for separating a mixture of two immiscible phases comprising about 50% aqueous phase and about 50% organic phase;

after initial testing, it appeared that the necessary dimensions for the settling tank are as follows: length 2 meters (m), width 0.7 m, usable height 1 m; and the submerged chute was installed at a depth of 0.5 m inside the settling tank and had a rectangular section of 0.15 m height by 0.55 m width, and was 0.17 m long, it had a completely open end and left a space of width 0.075 m on either side of the chute for allowing the liquids to move vertically.

I claim:

1. Mixer-settler apparatus for separating phases of liquid mixture, comprising at least one assembly having at least one mixer with mixer inlet means and fitted with stirring and pumping means, at least one chute having ends and being connected to said mixer, and a settling tank having a tank outlet means, said tank being fed with the liquid conveyed by said chute, wherein said chute has top and bottom faces and is submerged within said settling tank;

said submerged chute entering said settling tank by one of said ends of said settling tank and conveying the liquid close to the other end of said tank;

the width of said submerged chute occupying between about 75 and 90% of the width of said settling tank throughout a substantial portion of the length thereof; and said chute defining means for supplying the liquid at a flow rate such that a pre-settling occurs inside said submerged chute.

2. Apparatus according to claim 1, wherein the chute is situated at substantially the same level as the level separating the two phases of the mixture.

3. Apparatus according to claim 1, wherein said chute includes an opening extending through at least one of its top and bottom faces for facilitating the evacuation of phases which have already settled out within the chute.

4. Apparatus according to claim 1, wherein at least a portion of one of the top and bottom faces of said chute slopes relative to a horizontal plane.

5. Apparatus according to claim 1, wherein said chute includes a plurality of chutes disposed in parallel.

6. Mixer-settler apparatus for separating phases of liquid mixture, comprising at least one assembly having at least one mixer with mixer inlet means and fitted with stirring and pumping means, at least one chute having ends and being connected to said mixer, and a settling tank having a tank outlet means, said tank being fed with the liquid conveyed by said chute, wherein said chute has top and bottom faces and is submerged within said settling rank;

said submerged chute entering said settling tank by one of said ends of said settling tank and conveying the liquid close to the other end of said tank;

the width of said submerged chute occupying between about 75 and 90% of the width of said settling tank, said chute including an opening extending through at least one of its top and bottom faces for facilitating the evacuation of phases which have already settled out within the chute; and said chute defining means for supplying the liquid at a flow rate such that a pre-settling occurs inside said submerged chute.

* * * * *

UNITED STATES PATENT AND TRADEMARK OFFICE
CERTIFICATE OF CORRECTION

PATENT NO. : 4,844,801

DATED : July 4, 1989

INVENTOR(S) : Istvan Szanto

It is certified that error appears in the above-identified patent and that said Letters Patent is hereby corrected as shown below:

Column 3, Line 1, change "and" to --end--

Column 4, Lines 21 & 22, change "cros-ssection" to --cross-section--

Claim 6, Line 27, change "rank" to --tank--

Signed and Sealed this

Twenty-ninth Day of May, 1990

*Attest:*

HARRY F. MANBECK, JR.

*Attesting Officer*     *Commissioner of Patents and Trademarks*